(12) United States Patent
Osredkar et al.

(10) Patent No.: US 6,995,673 B1
(45) Date of Patent: Feb. 7, 2006

(54) TRANSPORTING HAZARDOUS MATERIAL USING AN OPTICAL READER OR RFID READER

(75) Inventors: Victoria M. Osredkar, Eugene, OR (US); Priscilla Ellen Osredkar, Eugene, OR (US)

(73) Assignee: Peter J. Osredkar, Eugene, OR (US)

( * ) Notice: Subject to any disclaimer, the term of this patent is extended or adjusted under 35 U.S.C. 154(b) by 0 days.

(21) Appl. No.: 11/098,325

(22) Filed: Apr. 4, 2005

(51) Int. Cl.
*G08B 13/14* (2006.01)

(52) U.S. Cl. .............. 340/572.1; 340/539.11; 235/384; 235/462.01

(58) Field of Classification Search .......... 340/572.1, 340/572.4, 10.1, 10.3, 10.6, 539.11; 235/384, 235/454, 462.01, 462.02
See application file for complete search history.

(56) References Cited

U.S. PATENT DOCUMENTS

| | | | | |
|---|---|---|---|---|
| 5,008,661 A | * | 4/1991 | Raj | ............... 340/10.51 |
| 5,448,220 A | * | 9/1995 | Levy | ............... 340/539.26 |
| 5,602,377 A | * | 2/1997 | Beller et al. | ............ 235/462.15 |
| 5,712,990 A | * | 1/1998 | Henderson | ................ 705/28 |
| 6,078,251 A | | 6/2000 | Landt et al. | |
| 6,170,746 B1 | * | 1/2001 | Brook et al. | ................ 235/385 |
| 6,641,052 B2 | | 11/2003 | Baillod et al. | |
| 6,729,540 B2 | | 5/2004 | Ogawa | |
| 2003/0009396 A1 | * | 1/2003 | DeVries et al. | ............... 705/28 |
| 2004/0204790 A1 | * | 10/2004 | Rice, Jr. | ............... 700/227 |

* cited by examiner

*Primary Examiner*—Toan N. Pham
(74) *Attorney, Agent, or Firm*—Peter J. Osredkar

(57) ABSTRACT

A preferred embodiment is directed to a method and system of identifying hazardous materials using an optical reader and an optical label. A first step is to locate the optical label on a transportation device. A second step is to activate a trigger control of the optical reader to engage power and begin scanning the optical label. Another step is to image the optical label to generate a first electromagnetic signal containing code of a hazardous material. Yet another step is to transmit the first electromagnetic signal to a host computer wherein the host computer transmits a second electromagnetic signal. A next step is to receive at the optical reader the second electromagnetic signal containing information on the hazardous material. The final step is to obtain the information about the hazardous material on a display of the optical reader.

24 Claims, 4 Drawing Sheets

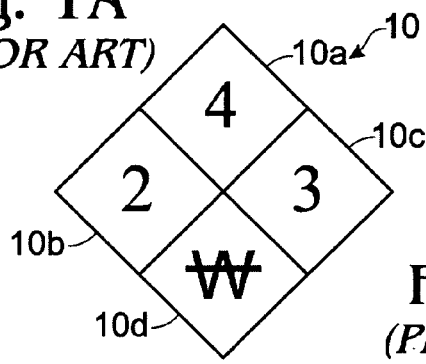
Fig. 1A (PRIOR ART)
Fig. 1B (PRIOR ART)
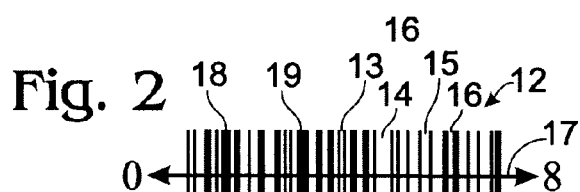
Fig. 2
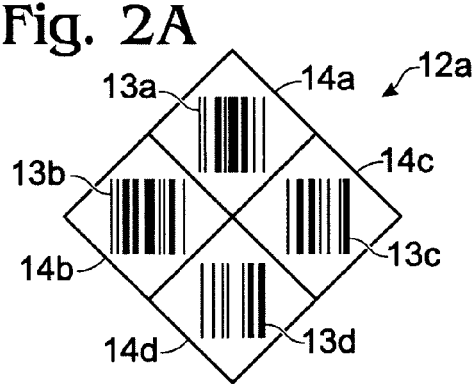
Fig. 2A

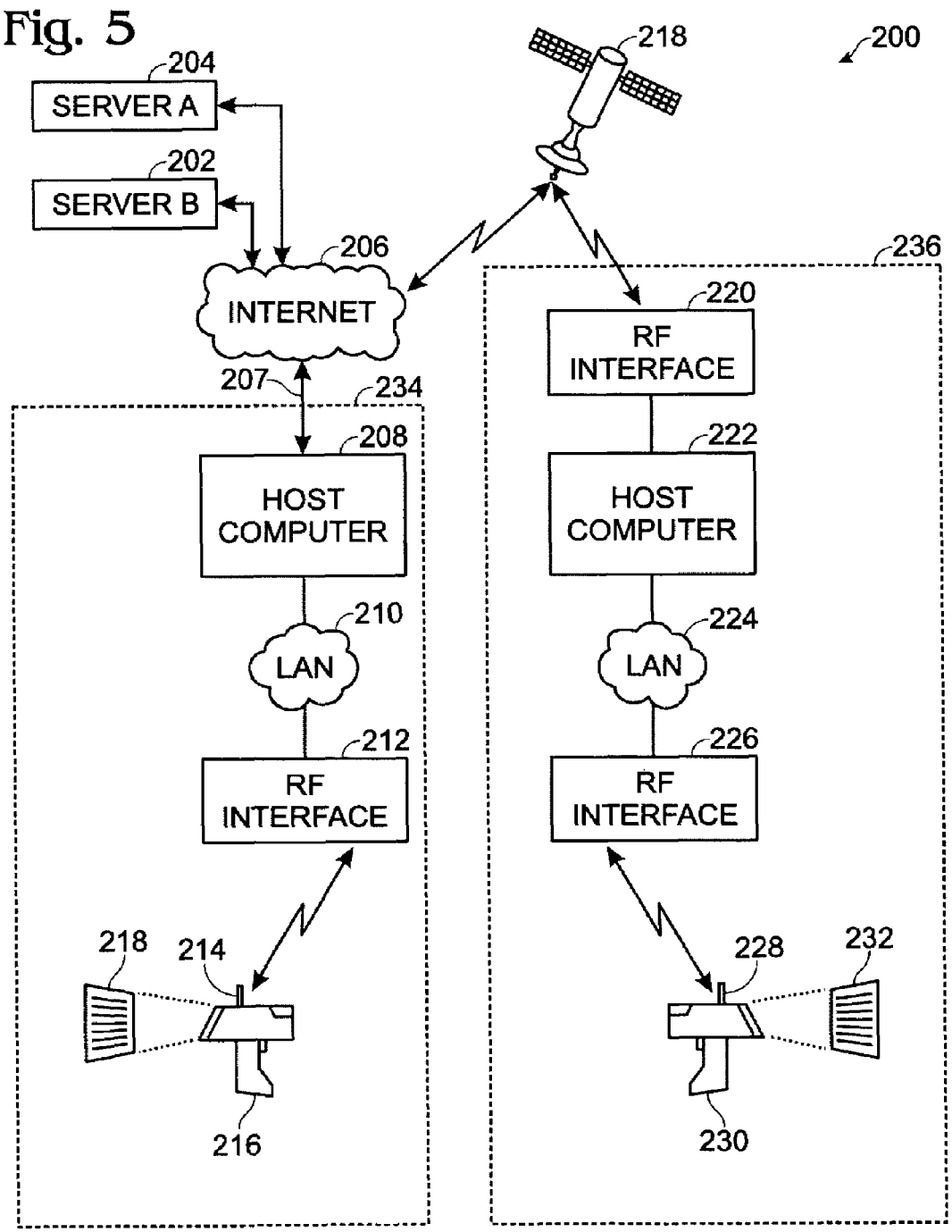

TRANSPORTING HAZARDOUS MATERIAL USING AN OPTICAL READER OR RFID READER

TECHNICAL FIELD

The field of the disclosure relates to optical and RFID readers and, more particularly, to a method, system and apparatus of transporting and identifying hazardous materials using optical labels, barcodes and/or RFID tags.

BACKGROUND

The transportation industry, whether it be highway trucking, rail cars, airplanes, barges and shipping, transport hazardous materials, chemicals, wastes and highly flammable fuels all over the world. These transportation systems move dangerous and sometimes lethal quantities of material through cities, neighborhoods and areas that if an accident occurs could kill hundreds of people. Once thought of as safe transportation devices some of these devices, for example airplanes, have been turned into lethal weapons by terrorists killing thousands of people.

The OSHA Hazard Communication Standard (HCS) requires all hazardous materials in the workplace be labeled in a manner that warns of any hazards the material may present. There are two methods of labeling, the first using the National Fire Protection Association (NFPA) diamond system and the Hazardous Material Identification Guide (HMIG) square system. Both systems identify a health hazard, a specific hazard, a fire hazard and reactivity of the material that is labeled.

The United State Department of Transportation (DOT) require that one of these system labels be mounted and located on transportation devices so as to be identifiable to emergency personnel in case of an accident or emergency. The information identified on the NFPA or HMIG label assists emergency personnel in assessing the emergency situation so that they may be able better to contain the situation and/or save lives. However, the labels make identification of a hazardous material in a container or transport device available to everyone. All an individual needs to do is study what the particular label colors and codes mean in the NFPA or HMIG systems. A terrorist could identify, for example, a rail car full of nuclear waste. The terrorist could highjack that rail car and drive it into a city with a bomb and explode it killing and injuring hundreds if not thousands of people.

U.S. Pat. No. 6,078,251 issued to Landt et al., entitled "Integrated Multi-meter And Wireless Communication Link," identifies objects through retrieving a template associated with an object. A user must retrieve the template prior to interrogation of the object and then load object identifier information into the template before downloading the data to a host. This patent is not readily adaptable to accept NFPA or HMIG hazardous material labels if used as described in this disclosure. Furthermore, the method and system would consume precious time when emergency personnel need to quickly identify a particular hazardous material.

In U.S. Pat. No. 6,170,746 issued to Brook et al., entitled "System And Method For Tracking Drugs In A Hospital," uses barcode scanning and printing to reduce errors in tracking drugs. This system uses a keyboard and a barcode scanner to identify a drug and track its use. This requires user interaction on the keyboard which is part of a local area network. This system does transmit locally by RF wireless. It does not use a wide area network allowing the system to transmit or receive NFPA or HMIG information to and from a variety of remote locations as described in this disclosure. Furthermore, the user must interact to update information files if this drug tracking system is to properly operate. The method and system as described in this disclosure for identifying hazardous materials does not require a user to update files, although the user may update files if desired.

In another, U.S. Pat. No. 6,641,052 issued to Baillod et al., entitled "System And Method For Authentication Of The Contents of Containers," teaches the authenticity of container contents is obtained through a RFID marker integrated into a anti-tampering device. This system is not readily adaptable to accept a NFPA or HMIG hazardous material labels if used as described in this disclosure. Furthermore, the NFPA and HMIG system as described in this disclosure does not require a mechanical type anti-tampering device.

U.S. Pat. No. 6,729,540 issued to Ogawa, entitled "System For Managing dynamic Situations Of Waste Transporting Vehicles," uses position measurement along with barcodes to identify the location of a vehicle. This system transmits manifest slip information on waste material and is adapted to a particular non-universal format. The system and method of this disclosure uses the HCS universal NFPA or HMIG format for identifying hazardous materials.

What is needed is a simple method, system and apparatus for effectively identifying what materials are in containers and transportation devices that would allow only emergency and police personnel to identify what is contained therein.

SUMMARY

It is an aspect of the preferred embodiment to provide a method, system and apparatus using optical code labels and RFID tags that contain hazardous material information.

It is another aspect of the preferred embodiment to provide a method, system and apparatus using optical code readers and RFID readers that allow only emergency and police personnel to identify what hazardous material is contained within containers and transportations devices.

It is yet another aspect of the preferred embodiment to provide a method, system and apparatus for updating information in a host computer using optical code labels and RFID tags that contain embedded hazardous material information.

It is still yet another aspect of the preferred embodiment to provide a method, system and apparatus to track hazardous material using optical code and RFID systems.

A preferred embodiment is directed to a method of identifying hazardous materials using an RFID reader and a RFID tag. A first step is to locate the RFID tag on a transportation device. A second step is to activate a trigger control of the RFID reader to engage power and begin interrogating the RFID tag. Another step is to read the RFID tag to generate a first electromagnetic signal containing code of a hazardous material. Yet another step is to transmit the first electromagnetic signal to a host computer wherein the host computer transmits a second electromagnetic signal. A next step is to receive at the RFID reader the second electromagnetic signal containing information on the hazardous material. The final step is to obtain the information about the hazardous material on a display of the RFID reader.

Another preferred embodiment is directed to a method of identifying hazardous materials using an optical reader and an optical label. A first step is to locate the optical label on a transportation device. A second step is to activate a trigger control of the optical reader to engage power and begin scanning the optical label. Another step is to image the optical label to generate a first electromagnetic signal containing code of a hazardous material. Yet another step is to transmit the first electromagnetic signal to a host computer wherein the host computer transmits a second electromagnetic signal. A next step is to receive at the optical reader the second electromagnetic signal containing information on the hazardous material. The final step is to obtain the information about the hazardous material on a display of the optical reader.

These and other aspects of the disclosure will become apparent from the following description, the description being used to illustrate the preferred embodiments when read in conjunction with the accompanying drawings.

BRIEF DESCRIPTION OF THE DRAWINGS

FIG. 1A illustrates the NFPA diamond identification of hazardous material.

FIG. 1B illustrates the HMIS square identification of hazardous material.

FIG. 2 illustrates an optical code encoded for use with NFPA or HMIS information in an embodiment of the disclosure.

FIG. 2A illustrates an optical code configuration in the NFPA format in one embodiment of the disclosure.

FIG. 5 is a block diagram illustrating a system for identifying hazardous material in a transportation device in an embodiment of the disclosure.

DETAILED DESCRIPTION OF THE PREFERRED EMBODIMENTS

Figure 2B:
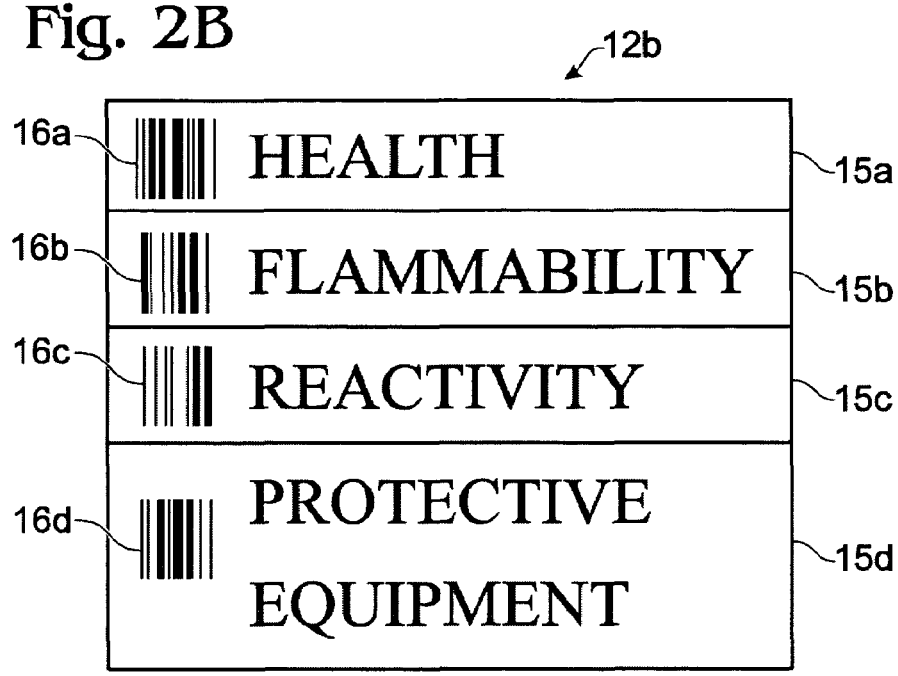
FIG. 2B illustrates an optical code configuration in the HMIS format in one embodiment of the disclosure.

While the preferred embodiments are described below with reference to an optical or RFID reader and optical labels or RFID tags, a practitioner in the art will recognize the principals described herein are viable to other applications.

FIG. 1B illustrates the prior art of the Hazardous Material Identification Standard (HMIS) square, and FIG. 1A illustrates the prior art of the National Fire Protection Agency (NFPA) diamond. In FIG. 1A the hazard identification signal is a color-coded array of four number or letters arranged in a diamond (NFPA). In the current art, hazard diamonds are mounted on transportation devices, including, but not limited to, trucks, storage tanks, bottles of chemicals, railroad tankers and cars, pallets and any vehicle or container that stores or transports hazardous materials. The diamond 10 comprises four smaller diamonds using the color red 10a, the color blue 10b, the color yellow 10c and the color white 10d. The color red 10a represents the flammability of the material wherein a "0" indicates the material will not burn and a "1" indicates the material must be pre-heated before ignition can occur. A "2" indicates the material must be moderately heated or exposed to relatively high ambient temperature before ignition may occur. A "3" indicates liquids and solids that can be ignited under almost all ambient temperature conditions. In addition, a "4" indicates materials that will rapidly or completely vaporize at atmospheric pressure and normal ambient temperature, or that are readily dispersed in air that will readily burn.

The color blue 10b represents the health hazard and type of possible injury wherein a "0" means material that on exposure under fire condition would offer no hazard beyond that of ordinary combustible material. A "1" indicates material that on exposure would cause irritation but only minor residual injury, and a "2" indicates a material that on intense or continued but not chronic exposure may cause temporary incapacitation or possible residual injury. A "3" indicates material that on short exposure may cause serious temporary or residual injury, and a "4" indicates material that on very short exposure may cause death or major residual injury.

The color yellow 10c represents the reactivity or the susceptibility of a material to burning wherein "0" indicates a material that is normally stable, even under fire exposure conditions and is not reactive with water. A "1" indicates material that in itself is normally stable, but which can become unstable at elevated temperatures and pressures. A "2" indicates material that readily undergoes violent chemical change at elevated temperatures and pressures or which reacts violently with water or which may form explosive mixtures with water. A "3" indicates material that in itself is capable of detonation or explosive decomposition or reaction but requires a strong initiating source or which must be heated under confinement before initiation or which reacts explosively with water. Also, a "4" indicates a material that is readily capable of detonation or of explosive decomposition or reaction at normal temperatures and pressures.

The color white 10d represents special precautions and protective gear that are required. A "W" indicates the material shows unusual reactivity with water and "OX" indicates materials that possess oxidizing properties. In addition, "ACID" indicates the material is an acid, "ALK" indicates the material is a base, "COR" indicates the material is corrosive and "€" indicates the material is radioactive.

In FIG. 1B the hazard identification signal is a color-coded array of four number or letters arranged in a square 11 (HMIS). In the current art, hazard squares are mounted on transportation devices, including, but not limited to, trucks, storage tanks, bottles of chemicals, railroad tankers and cars, pallets and any vehicle or container that stores or transports hazardous materials. The square comprises four smaller rectangles using the color blue 11a, the color red 11b, the color yellow 11c and the color white 11d. The color red 11b represents the flammability of the material wherein a "0" indicates the material will not burn and a "1" indicates the material must be pre-heated before ignition can occur. A "2" indicates the material must be moderately heated or exposed to relatively high ambient temperature before ignition may occur. A "3" indicates liquids and solids that can be ignited under almost all ambient temperature conditions. In addition, a "4" indicates materials that will rapidly or completely vaporize at atmospheric pressure and normal ambient temperature, or that are readily dispersed in air that will readily burn.

The color blue 11a represents the health hazard and type of possible injury wherein a "0" indicates material that on exposure under fire condition would offer no hazard beyond that of ordinary combustible material. A "1" indicates material that on exposure would cause irritation but only minor residual injury, and a "2" indicates a material that on intense or continued but not chronic exposure may cause temporary incapacitation or possible residual injury. A "3" indicates material that on short exposure may cause serious temporary or residual injury, and a "4" indicates material that on very short exposure may cause death or major residual injury.

The color yellow 11c represents the reactivity or the susceptibility of a material to burning wherein "0" indicates material that in itself is normally stable, even under fire exposure conditions and is not reactive with water. A "1" indicates material that in itself is normally stable, but which can become unstable at elevated temperatures and pressures. A "2" indicates material that readily undergoes violent chemical change at elevated temperatures and pressures or which reacts violently with water or which may form explosive mixtures with water. A "3" indicates material that in itself is capable of detonation or explosive decomposition or reaction but requires a strong initiating source or which must be heated under confinement before initiation or which reacts explosively with water. Also, a "4" indicates material that in itself is readily capable of detonation or of explosive decomposition or reaction at normal temperatures and pressures.

The color white 11d represents special precautions and a symbol system A–H identifies the personal protective equipment (PPE) required for a user to be adequately protected from the hazardous material. The symbol "A" indicates safety glasses, "B" indicates safety glasses and gloves, "C" indicates safety glasses, gloves and an apron and "D" indicates a face shield, gloves and an apron. In addition, the symbol "E" indicates safety glasses, gloves and a dust respirator, "F" indicates safety glasses, gloves, an apron and a dust respirator and "G" indicates safety glasses, gloves and a vapor respirator. Finally, the symbol "H" indicates splash goggles, gloves, an apron and vapor respirator.

FIG. 2 illustrates an optical code 12 in the form of a barcode. The color HMIS square and the color NFPA diamond system is substitutable and incorporatable into a barcode system comprising a label with many formatted bars and spaces. The bars form various widths and the spaces are of various widths wherein together they represent a string of digits. These digits may be used to identify all hazardous materials according to the NFPA and HMIS standards. The barcode 12 consists of various widths, such as 13, 18 and 9, and a number of spaces of varying widths, such as 14, 15 and 16, that are prearranged to represent a string of digits in a form that will identify particular information in a host computer. The barcode 12 may identify a hazardous material using the HMIS or NFPA standard. For example, if the hazardous material was high grade jet fuel the barcode label would be formed so that the bars and spaces of various widths would represent digits to identify what is the name and chemical composition on the hazardous material. These digits would be processed by a host computer to identify the particular hazardous material after a user takes a reading from an optical reader. In addition, the bar code digits may be formed so as to identify with transportation bill of lading wherein the actual bill of lading may be in the memory of a host computer whereby the host computer is updatable with current transportation information. The information may take the form of where the shipment originated and the destination of the shipment. The updateable bill of lading may also include information on the shipments route and/or information related to suspicious illegal or terrorist activity. In any event, a plurality of digits (barcodes) may be assigned various descriptions representing HMIS or NFPA standards depending upon the desired software programming.

FIG. 2A illustrates an embodiment of the disclosure using an optical code (barcode) as a NFPA diamond barcode label 12a. The first area 14a would have a red background with barcode 13a representing a string of digits to identify the flammability of the hazardous material according to the NFPA standard. For example, if the material was highly flammable the barcode would contain bars and spaces with various widths corresponding to two digits "1" and "3." The first digit "1" may indicate that the precursor is red which illustrates a flammable material. The digit "3" may indicate the material was flammable under any condition as provided by the NFPA standard. A host computer would have in memory information pertaining to the digits "1" and "3," wherein processing in the host computer would quickly provide the user this information about the hazardous material.

The second area 14b would have a blue background with barcode 13b representing a string of digits to identify the health hazard of the hazardous material according to the NFPA standard. For example, if the material was mildly corrosive the barcode would contain bars and spaces with various widths corresponding to two digits "2" and "3." The first digit "2" may indicate that the precursor is blue which illustrates a health hazard material. The digit "3" would indicate the material on short exposure may cause serious temporary or residual injury as provided by the NFPA standard. A host computer would have in memory information pertaining to the digits "2" and "3," wherein processing in the host computer would quickly provide the user this information about the hazardous material.

The third area 14c would have a yellow background with barcode 13c representing a string of digits to identify the reactivity of the hazardous material according to the NFPA standard. For example, if the material was jet fuel the barcode would contain bars and spaces with various widths corresponding to two digits "3" and "4." The first digit "3" may indicate that the precursor is yellow which illustrates the reactivity of the material. The digit "4" would indicate the material in itself is readily capable of detonation or of explosive decomposition or reaction at normal temperatures as provided by the NFPA standard. A host computer would have in memory information pertaining to the digits "3" and "4," wherein processing in the host computer would quickly provide the user this information about the hazardous material.

The fourth area 14d would have a white background with barcode 13d representing a string of digits to identify the protective equipment needed to handle the hazardous material according to the NFPA standard. For example, if the material was caustic soda the barcode would contain bars and spaces with various widths corresponding to two digits "4" and "3." The first digit "4" may indicate the precursor is white which illustrates the protective equipment needed to handle the material. The digit "3" would indicate the material was and acid and the needed protective equipment would include eye shields, gloves and apron as provided by the NFPA standard. A host computer would have in memory information pertaining to the digits "4" and "3," wherein processing in the host computer would quickly provide the user this information about the hazardous material. In the fourth area representing PPE, the digits with corresponding bar and space widths on the optical label would include, "1" in place of a € where the material reacts with water and "2" in place of an OX where the material possesses oxidizing properties. In addition, other digits would include a "3" in place of ACID where the material is an acid, a "4" in place of AKL where the material is a base, a "5" in place of COR where the material is corrosive and a "6" in place € where the material is radioactive. Furthermore, the digits 1, 2, 3, 4, 5, and 6 may represent what protective equipment is needed for a particular hazardous material after software processes the digits with information stored in memory of a host computer.

FIG. 2B illustrates an embodiment of the disclosure using an optical code as a HMIS square barcode label 12b. The first area 15a would have a blue background with barcode 16a representing a string of digits to identify the health hazard of the hazardous material according to the HMIS standard. For example, if the material was mildly corrosive the barcode would contain bars and spaces with various widths corresponding to two digits "1" and "3." The first digit "1" may indicate that the precursor is blue which illustrates a health hazard material. The digit "3" would indicate the material on short exposure may cause serious temporary or residual injury as provided by the HMIS standard. A host computer would have in memory information pertaining to the digits "1" and "3," wherein processing in the host computer would quickly provide the user this information about the hazardous material.

The second area 15b would have a red background with barcode 16b representing a string of digits to identify the flamability of the hazardous material according to the HMIS standard. For example, if the material was highly flammable the barcode would contain bars and spaces with various widths corresponding to two digits "2" and "3." The first digit "2" may indicate that the precursor is red which illustrates a flammable material. The digit "3" indicating the material was flammable under any condition as provided by the HMIS standard. A host computer would have in memory information pertaining to the digits "2" and "3," wherein processing in the host computer would quickly provide the user this information about the hazardous material.

The third area 15c would have a yellow background with barcode 16c representing a string of digits to identify the reactivity of the hazardous material according to the HMIS standard. For example, if the material was jet fuel the barcode would contain bars and spaces with various widths corresponding to two digits "3" and "4." The first digit "3" may indicate that the precursor is yellow which illustrates the reactivity of the material. The digit "4" would indicate the material in itself is readily capable of detonation or of explosive decomposition or reaction at normal temperatures as provided by the HMIS standard. A host computer would have in memory information pertaining to the digits "3" and "4," wherein processing in the host computer would quickly provide the user this information about the hazardous material.

The fourth area 15d would have a white background with barcode 16d representing a string of digits to identify the protective equipment needed to handle the hazardous material according to the HMIS standard. For example, if the material was caustic soda the barcode would contain bars and spaces with various widths corresponding to two digits "4" and "3." The first digit "4" may indicate that the precursor is white which illustrates the protective equipment needed to handle the material. The digit "3" would indicate the needed protective equipment would include safety glasses, gloves and apron as provided by the HMIS standard. A host computer would have in memory information pertaining to the digits "4" and "3," wherein processing in the host computer would quickly provide the user this information about the hazardous material. In the fourth area (PPE) the digits with corresponding bar and space widths on the optical label would include, "1" in place of an A where the protective equipment (PPE) is safety glasses and "2" in place of a B where the PPE are safety glasses and gloves. In addition, other digits would include a "3" in place of a C where the PPE are safety glasses, gloves and an apron, a "4" in place of a D where the PPE are a face shield, gloves and an apron and a "5" in place of an E where the PPE are safety glasses, gloves and a dust respirator. Others digits would include a "6" in place of a F where the PPE are safety glasses, gloves, an apron and a dust respirator, a "7" in place of a G where the PPE are safety glasses, gloves and a vapor respirator and a "8" in place of a H where the PPE are splash goggles, gloves, and apron and a vapor respirator. Furthermore, the digits 1, 2, 3, 4, 5, 6, 7 and 8 may represent what protective equipment is needed for a particular hazardous material after software processes the digits with information stored in memory of a host computer.

Figure 2C:
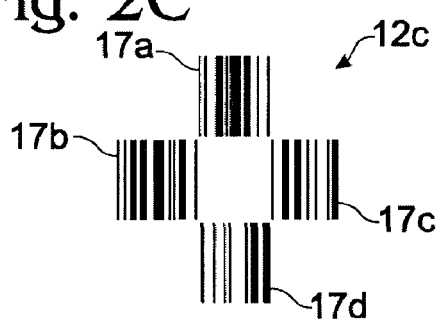
FIG. 2C illustrates an optical code configuration in the NFPA format in one embodiment of the disclosure.

FIG. 2C illustrates a preferred embodiment of the disclosure using an optical code as a NFPA diamond barcode label 12c. The first barcode 17a would represent a string of digits to identify the flammability of the hazardous material according to the NFPA standard. For example, if the material was highly flammable the barcode would contain bars and spaces with various widths corresponding to two digits "1" and "3." The first digit "1" may indicate "flammability" as the material precursor. The digit "3" may indicate the material was flammable under any condition as provided by the NFPA standard. A host computer would have in memory information pertaining to the digits "1" and "3," wherein processing in the host computer would quickly provide the user this information about the hazardous material.

The second barcode 17b would represent a string of digits to identify the health hazard of the hazardous material according to the NFPA standard. For example, if the material was mildly corrosive the barcode would contain bars and spaces with various widths corresponding to two digits "2" and "3." The first digit "2" may indicate "health hazard" as the material precursor. The digit "3" would indicate the material on short exposure may cause serious temporary or residual injury as provided by the NFPA standard. A host computer would have in memory information pertaining to the digits "2" and "3," wherein processing in the host computer would quickly provide the user this information about the hazardous material.

The third barcode 17c would represent a string of digits to identify the reactivity of the hazardous material according to the NFPA standard. For example, if the material was jet fuel the barcode would contain bars and spaces with various widths corresponding to two digits "3" and "4." The first digit "3" may indicate "reactivity" as the material precursor. The digit "4" would indicate the material in itself is readily capable of detonation or of explosive decomposition or reaction at normal temperatures as provided by the NFPA standard. A host computer would have in memory information pertaining to the digits "3" and "4," wherein processing in the host computer would quickly provide the user this information about the hazardous material.

The fourth barcode 17d would represent a string of digits to identify the protective equipment needed to handle the hazardous material according to the NFPA standard. For example, if the material was caustic soda the barcode would contain bars and spaces with various widths corresponding to two digits "4" and "3." The first digit "4" may indicate "personal protective equipment (PPE)" as the precursor for exuipment needed to handle the hazardous material. The digit "3" would indicate the material was and acid and the needed protective equipment would include eye shields, gloves and apron as provided by the NFPA standard. A host computer would have in memory information pertaining to the digits "4" and "3," wherein processing in the host computer would quickly provide the user this information about the hazardous material. In the fourth area (PPE) the digits with corresponding bar and space widths on the optical label would include, "1" in place of a W where the material reacts with water and "2" in place of OX where the material possesses oxidizing properties. In addition, other digits would include a "3" in place of ACID where the material is an acid, a "4" in place of AKL where the material is a base, a "5" in place of COR where the material is corrosive and a "6" in place of where the material is radioactive. Furthermore, the digits 1, 2, 3, 4, 5, and 6 may represent what protective equipment is needed for a particular hazardous material after software processes the digits with information stored in memory of a host computer.

Figure 2D:
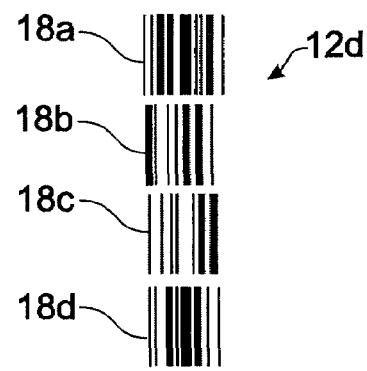
FIG. 2D illustrates an optical code configuration in the HMIS format in one embodiment of the disclosure.

FIG. 2D illustrates a preferred embodiment of the disclosure using an optical code as a HMIS square barcode label 12d. The first barcode 18a would represent a string of digits to identify the health hazard of the hazardous material according to the HMIS standard. For example, if the material was mildly corrosive the barcode would contain bars and spaces with various widths corresponding to two digits "1" and "3." The first digit "1" may indicate "health hazard" as the material precursor. The digit "3" would indicate the material on short exposure may cause serious temporary or residual injury as provided by the HMIS standard. A host computer would have in memory information pertaining to the digits "1" and "3," wherein processing in the host computer would quickly provide the user this information about the hazardous material.

The second barcode 18b would represent a string of digits to identify the flamability of the hazardous material according to the HMIS standard. For example, if the material was highly flammable the barcode would contain bars and spaces with various widths corresponding to two digits "2" and "3." The first digit "2" may indicate "flammability" as the material precursor. The digit "3" would Indicate that the material was flammable under any condition as provided by the HMIS standard. A host computer would have in memory information pertaining to the digits "2" and "3," wherein processing in the host computer would quickly provide the user this information about the hazardous material.

The third barcode 18c would represent a string of digits to identify the reactivity of the hazardous material according to the HMIS standard. For example, if the material was jet fuel the barcode would contain bars and spaces with various widths corresponding to two digits "3" and "4." The first digit "3" may indicate "reactivity" as the material precursor. The digit "4" would indicate the material in itself is readily capable of detonation or of explosive decomposition or reaction at normal temperatures as provided by the HMIS standard. A host computer would have in memory information pertaining to the digits "3" and "4," wherein processing in the host computer would quickly provide the user this information about the hazardous material.

The fourth barcode 18d would represent a string of digits to identify the protective equipment needed to handle the hazardous material according to the HMIS standard. For example, if the material was caustic soda the barcode would contain bars and spaces with various widths corresponding to two digits "4" and "3." The first digit "4" may indicate "PPE" as the precursor for equipment needed to handle the hazardous material. The digit "3" would indicate the needed protective equipment would include safety glasses, gloves and apron as provided by the HMIS standard. A host computer would have in memory information pertaining to the digits "4" and "3," wherein processing in the host computer would quickly provide the user this information about the hazardous material. In the fourth area (PPE), the digits with corresponding bar and space widths on the optical label would include, a "1" in place of an A where the personal protective equipment is safety glasses and a "2" in place of a B where the PPE are safety glasses and gloves. In addition, other digits would include a "3" in place of a C where the PPE are safety glasses, gloves and an apron, a "4" in place of a D where the PPE are a face shield, gloves and an apron and a "5" in place of an E where the PPE are safety glasses, gloves and a dust respirator. Others digits would include a "6" in place of a F where the PPE are safety glasses, gloves, an apron and a dust respirator, a "7" in place of a G where the PPE are safety glasses, gloves and a vapor respirator and a "8" in place of a H where the PPE are splash goggles, gloves, and apron and a vapor respirator. Furthermore, the digits 1, 2, 3, 4, 5, 6, 7 and 8 may represent what protective equipment is needed for a particular hazardous material after software processes the digits with information stored in memory of a host computer.

Figure 3:
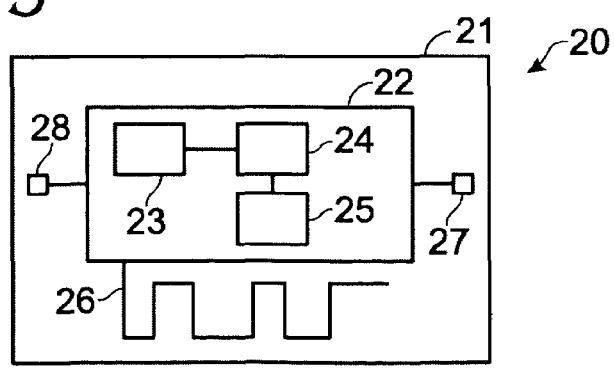
FIG. 3 illustrates an RFID tag preprogrammed with NFPA or HMIS information in an embodiment of the disclosure.

FIG. 3 illustrates a RFID tag 20 in an embodiment of the disclosure. The RFID tag system, that is a device which is used to identify an object when queried remotely by an RFID interrogating circuit, is programmable using the color HMIS square and the color NFPA diamond standard. The RFID tag 20 may comprise a substrate 21, a semiconductor circuit 22 and a transmitting/receiving antenna 26. The semiconductor circuit 22 (programmable RF chip) further comprises a programmable memory 23, logic circuits 24 and RF circuits 25. Circuits like this used in RF tags are well known and a variety of circuits are commercially available that are suitable to form an essential building block of a RFID tag. The semiconductor 22 has a first connection 27 and a second connection 28. The connections 27 and 28 provide an input/output connection to the RF circuitry in the semiconductor 22. The connections 27 and 28 each have impedance that may be varied by the logic circuits 24. When an RF signal is transmitted from an RFID interrogator (reader), the RF tag is sensed by a circuit in the semiconductor 22. A logic circuit 24 causes the impedance to change between the connections 27 and 28. The impedance change modulates the RF signal reflected from the tag 20. This modulation allows the RF tag 20 to send information back to the RFID interrogator. The RFID tag 20 memory 23 is preprogrammed with information pertaining to HMIS or NPFA standards on a particular hazardous material.

For example, the memory 23 of the RFID tag 20 may be preprogrammed with information pertaining to hazardous material such as high grade jet fuel. The memory 23 would be preprogrammed to provide a modulated backscatter signal. This signal would identify the information on the tag as that of high grade jet fuel flammability when processed in a host computer after being interrogated by an RFID reader. The preprogramming would be such that a backscatter signal after processing in a host computer may identify the jet fuel health hazard. Thus by the HMIS standard, the jet fuel health hazard is a material that on intense or continued but not chronic exposure would cause irritation but only minor residual injury. The preprogramming would be such that a backscatter signal after processing in a host computer may identify the jet fuel reactivity. Thus by the HMIS standard, jet fuel reactivity is a material that is readily capable of detonation or of explosive decomposition or reaction at normal temperatures and pressures. Finally, the preprogramming would be such that a backscatter signal may identify the jet fuel PPE requirements. Thus by the HMIS standard, the jet fuel PPE needed are safety glasses, gloves and a vapor respirator. All hazardous materials may be preprogrammed onto RFID tags using the NFPA and HMIS standard.

Figure 4:
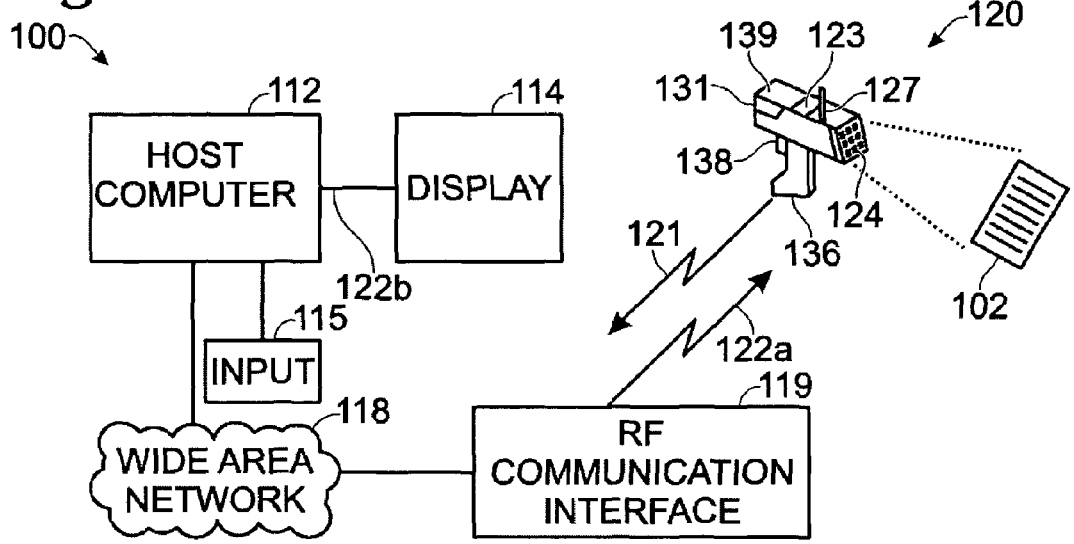
FIG. 4 is a block diagram illustrating a system for identifying hazardous material in a transportation device in an embodiment of the disclosure.

FIG. 4 illustrates one embodiment of system 100 which identifies hazardous materials in transportation devices (not shown), including, but not limited to, trucks, storage tanks, bottles of chemicals, railroad tankers and cars, pallets and any vehicle or container that stores or transports hazardous materials. The system 100 includes a host computer 112 with associated memory, a first display 114, a keyboard 115 or other input device, connection to a wide area network (WAN) 118 and an optical reader 120. Alternately, the WAN is substitutable for a local area network (LAN), internet or satellite communication. The WAN 118 includes the capability of wireless communication through a radio frequency (RF) interface 119. The RF interface 119 allows the host computer 112 on the WAN 118 to communicate with the portable optical reader 120. The host computer 112 with wireless communication capability maintains in its memory the records of all possible hazardous materials formatted with the HMIS or NFPA standard. The portable optical reader 120 allows identification and tracking of all hazardous materials that are either transported from place to place or maintained in a storage facility.

The portable optical reader 120 is a hand-held optical unit. A user may operate the optical reader 120 by pointing and sweeping the unit at and across a target 102 located on either a transportation device or container. Alternately, the hand-held optical reader is substitutable with a fixed optical reader for stationary reading of, for example, small containers, bottles and the like. In a fixed optical reader system, the container may be brought into reading range and swept across the optical reader range of field. The target 102 may be a barcode or other optical label that is formatted with various bars and spaces. These bars and spaces of varying widths represent digits that when imaged and processed in a host computer 112 will provide the user with information pertaining to a hazardous material. The portable optical reader 120 begins to image the target 102 at the second input (imager) 124 and generates a first signal 122 after reading the target 102. The user pushes the trigger 138, located at the handle 136 of the optical reader 120, to begin reading the target 102 through an imager (second input) 124. All the circuitry of the optical reader 120 is located within the portable housing 139 including a portable battery 131 that powers the optical reader 120. The host computer 112 receives the first signal through the RF interface 119 and the wide area network 118. The host computer 112 receives the first signal 122 comprising a string of digits that when processed will identify a hazardous material according to NFPA and HMIS standards. The host computer 112 internally processes the first signal 122 by searching its memory comparing the received string of digits to stored information on the hazardous material. When the host computer 112 finds a match, the internal processing continues wherein the host computer generates a second signal 122a and transmits the second signal 122a containing current NFPA or HMIS information on the hazardous material. This information is then read by a user on a second display means 123 of the optical reader 120 so that the user may identify by NFPA or HMIS standards the hazardous material. Alternately, the second signal may be transmitted by cable 122b to a first display 114. The second signal may concurrently be transmitted to both display means, that is, the first and second display. The RF communication interface 119 with the associated antenna 127 includes a receiver and transmitter or transceiver to allow two-way communication between the portable optical reader 120 and the host computer 112 via the wide area network 118. The display means may include devices that are visual, printed and/or audio.

The hazardous material identification system 100 includes a first display 114 that is controlled by displaying prompts to the user to enter particular information through the first input 115 so as to lead the user through a hazardous material tracking operation. The system 100 includes an internal processing unit in the host computer 112 with one or more microprocessors for controlling the collection of data in the memory. The software and processing unit collects data in the memory by selectively associating input means information received from the first input 115, the second input 124 and the RF interface 119. Typically, the first input 115 may enter tracking information such as departing time from a particular location of hazardous material, for example, hazardous material that was loaded onto a truck tanker in Los Angeles, Calif. Furthermore, additional information such as arrival time of the hazardous material and destination, such as Portland, Oreg., may be entered into the host computer at the first input 115. In particular, the selective association of data in the memory allows the processing unit to transmit and/or display selected portions of the associated data. This helps emergency personal who may ask for only HMIS or NFPA standard information after reading the target 102.

In FIG. 4, there is shown a typical optical code reader 120 on a label 102, which may be attached to an item and identifies that item on a transportation device. The data representing the item is obtained by a terminal such as an imager contained in the housing 139 of the optical reader 120. The optical reader 120 provides barcode image signals which are digitized as by an analog to digital converter contained with the housing 139. The digitized signal is transmitted to the decoder in the housing 139 of the optical reader 120, generating a first signal 122 to provide serial binary data representing the bar code. This data is inputted into a microprocessor of the host computer 112. The microprocessor exercises several functions. These functions include, but are not limited to, a scan control signal generation for enabling the barcode or optical imager to scan across the code of the target 102, when the optical reader 120 comes into proximity of the target.

The wireless radio communications features are provided by a RF interface 119 including a receiver, a transmitter and modulator. The transmitter and modulator provide transmission where a carrier is moved between states, according to different binary bits of a message. For example, the output frequency in an embodiment of the invention may be in the ultra-high frequency (UHF) band, in the very high frequency (VHF) band or other bands at a relatively low power. In one embodiment, such as reading a target in a remote location, high power transmitters are needed to cover a large enough area for remote collection of the data from barcode or optical code readers. In another embodiment, such as reading a target in a warehouse, low power transmitters are sufficient to cover a large enough area for remote collection of the data from the barcode or optical code readers.

FIG. 4 illustrates another embodiment of system 100 which identifies hazardous materials in transportation devices (not shown), including, but not limited to, trucks, storage tanks, bottles of chemicals, railroad tankers and cars, pallets and any vehicle or container that stores or transports hazardous materials. The system 100 includes a host computer 112 with associated memory, a first display 114, a keyboard 115 or other input devices, a connection to a wide area network (WAN) 118 and a RFID reader 120. Alternately, the WAN is substitutable for a local area network (LAN), internet or satellite communication. The WAN 118 includes the capability of wireless communication through a radio frequency (RF) interface 119. The RF interface 119 allows the host computer 112 on the WAN 118 to communicate with the portable RFID reader 120. The host computer 112 with wireless communication capability maintains in its memory the records of all possible hazardous materials formatted with the HMIS or NFPA standard. The portable RFID reader allows identification and tracking of all hazardous materials that are either transported from place to place or maintained in a storage facility.

The portable RFID reader 120 or interrogator is a handheld optical unit. A user can operate the RFID reader 120 by pointing the unit at a RFID tag 102 located on either a transportation device or storage container. The RFID tag 102 is preprogrammed with information pertaining to a hazardous material. The portable RFID reader 120 begins to interrogate the tag 102 at the second input (interrogator) 124 and generates a first signal 122 which is a modulated backscatter signal after interrogating the RFID tag 102. The user pushes the trigger 138 located at the handle 136 of the RFID reader 120 to begin interrogating the tag 102 through an interrogator (second input) 124. All the circuitry of the RFID reader 120 is located within the portable housing 139 including a portable battery 131 that powers the RFID reader 120. The host computer 112 receives the first signal through the RF interface 119 and the wide area network 118. The host computer 112 receives the first signal 122 comprising a preprogrammed algorithm containing information on a hazardous material according to NFPA and HMIS standards. The host computer 112 internally processes the first signal 122 by searching its memory comparing the received modulated backscatter signal to stored information on the hazardous material. When the host computer 112 finds a match, the internal processing continues wherein the host computer generates a second signal 122a and transmits the second signal 122a containing current NFPA or HMIS information on the hazardous material. This information is then read by a user on a second display means 123 of the RFID reader 120 so that the user may identify by NFPA or HMIS standards the hazardous material. Alternately, the second signal may be transmitted by cable 122b to a first display means 114. The second signal may concurrently be transmitted to both display means, that is, the first and second display. The RF communication interface 119 with the associated antenna 127 includes a receiver and transmitter or transceiver to allow two-way communication between the portable RFID reader 120 and the host computer 112 via the wide area network 118. The display means may be devices that are visual, print and/or audio.

The hazardous material identification system 100 includes a first display 114 that is controlled to display prompts to the user to enter particular information through the first input 115 so as to lead the user through a hazardous material tracking operation. The system 100 includes an internal processing unit in the host computer 112 with one or more microprocessors for controlling the collection of data in the memory. The software and processing unit collects data in the memory by selectively associating input means information received from the first input 115, the second input 124 and the RF interface 119. Typically, the first input 115 may enter tracking information such as departing time from a particular location of hazardous material, for example, hazardous material that was loaded onto a truck tanker in Los Angeles, Calif. Furthermore, additional information such as arrival time of the hazardous material and destination, such as Portland, Oreg., may be entered into the host computer at the first input 115. In particular, the selective association of data in the memory allows the processing unit to transmit and/or display selected portions of the associated data. This helps emergency personal who may ask for only HMIS or NFPA standard information after reading the target 102.

In FIG. 4, there is shown a typical RFID reader 120 and a RFID tag 102, which may be attached to an item and identifies that item on a transportation device. The data representing the item is obtained by a terminal such as an interrogator contained in the housing 139 of the RFID reader 120. The reader 120 provides RF backscatter signals from the tag 102 which are digitized as by an analog to digital converter contained with the housing 139. The digitized signal is transmitted to the decoder in the housing 139 of the RFID reader 120, generating a first signal 122 to provide serial binary data representing the modulated backscatter signal from the tag. This signal and the data contained therein are inputted into a microprocessor of the host computer 112. The microprocessor exercises several functions. These functions include, but are not limited to, a control signal generation for enabling the interrogator to read the tag 102, when the RFID reader 120 comes into proximity of the RFID tag 102.

The wireless radio communications features are provided by a RF interface 119 including a receiver, a transmitter and modulator. The transmitter and modulator provides transmission where a carrier is moved between states, according to different binary bits of a message. For example, the output frequency in an embodiment of the invention may be in the ultra-high frequency (UHF) band, in the very high frequency (VHF) band or other bands at a relatively low power. In one embodiment, such as reading a RFID tag in a remote location, high power transmitters are needed to cover a large enough area for remote collection of data from the RFID reader. In another embodiment, such as reading a RFID tag in a warehouse, low power transmitters are sufficient to cover a large enough area for remote collection of data from the RFID reader.

FIG. 5 illustrates hazardous materials identification system 200 using the internet 206 or WAN and providing hazardous material information for at least two remote locations 234 and 236. At the first location 234, an optical code reader 216 images an optical code or barcode 218 generating a first signal. The first signal is transmitted by a first antenna 214 through a first RF interface 212 via a first local area network (LAN) 210 to a first host computer 208. At the second location 236, an RFID reader 230 interrogates a RFID tag 232 generating a second signal. The second signal is transmitted by a second antenna 228 through a second RF interface 226 via a second local area network 224 to a second host computer 222. Although two remote areas are discussed, many remote areas may be used in system 200 wherein there may be a plurality of optical readers and/or RFID readers. The data collected by the first host computer 208 through the first LAN 208 is processed locally. Likewise, the data collected by the second host computer 222 through the second LAN 224 is processed locally. To the extent the received data requires a response, the first host computer 208 retrieves data, processes information and retransmits the data as a third signal through the first RF interface 212 to the optical reader 216. Likewise, to the extent the received data requires a response, the second host computer 222 retrieves data, processes information and retransmits the data as a fourth signal through the second RF interface 226 to the RFID reader 230. Both the optical reader 216 and RFID reader 230 have local displays so that the user may obtain the desired hazardous material information.

In the event the RFID reader or optical reader requests should require retrieval of data not stored on the first or second host computer, the first and second host computer may retrieve data from external sources. The second host computer 222 through a third RF interface 220 may communicate with a satellite or wireless communication, and retrieve data from IP addressable severs 202 and 204 through a wide area communications network or internet 206. Likewise, the first host computer 204 may communicate through a land line 207, such as through telephone dial-up connections or dedicated optical cable. The first host computer may retrieve data from IP addressable servers 202 and 204 through a wide area communications network 206. Thus system 200 is useful to a user to locate and find updated information on a particular hazardous material shipment. For example, a user may try and read a target at remote area 234 or 236, wherein a container of hazardous material has spilled and partially destroyed the optical label 218 or RFID tag 232. In this case, the user may need to remotely locate the origin of the container and request information regarding the hazardous material that only the origination location might have. The user would request through the optical reader 216 or RFID reader 232, information about the hazardous material retrieving data from IP addressable severs 202 or 204.

The first host computer 208 at remote site 234 may also use the wide area communications network 206 to communicate to the second host computer 222 at remote site 236. The two sites may be linked to provide pass through communication between the optical reader 216 and the RFID reader 230. In one embodiment, the first host computer 208 and the second host computer 222 communicate over the wide area network 206 with open standard protocols and data types as used by an Internet server. The system 200 would permit the first host computer 208 to retrieve and utilize hazardous material data from the servers without complex data conversion and translation routines. An open architecture standard is designed into the optical and RFID readers so that data files may be transparently retrieved. In addition, system 200 may use encryption technology or use a secure closed communication link to transmit and receive the sensitive and confidential hazardous material data. A secure system would ensure that terrorist would not be able to gain access to the hazardous material information. Furthermore, the preprogramming of the RF tag and digitization of the barcode labels may be periodically changed reorganizing hazardous material information. This would improve the security of system 200.

Figure 6:
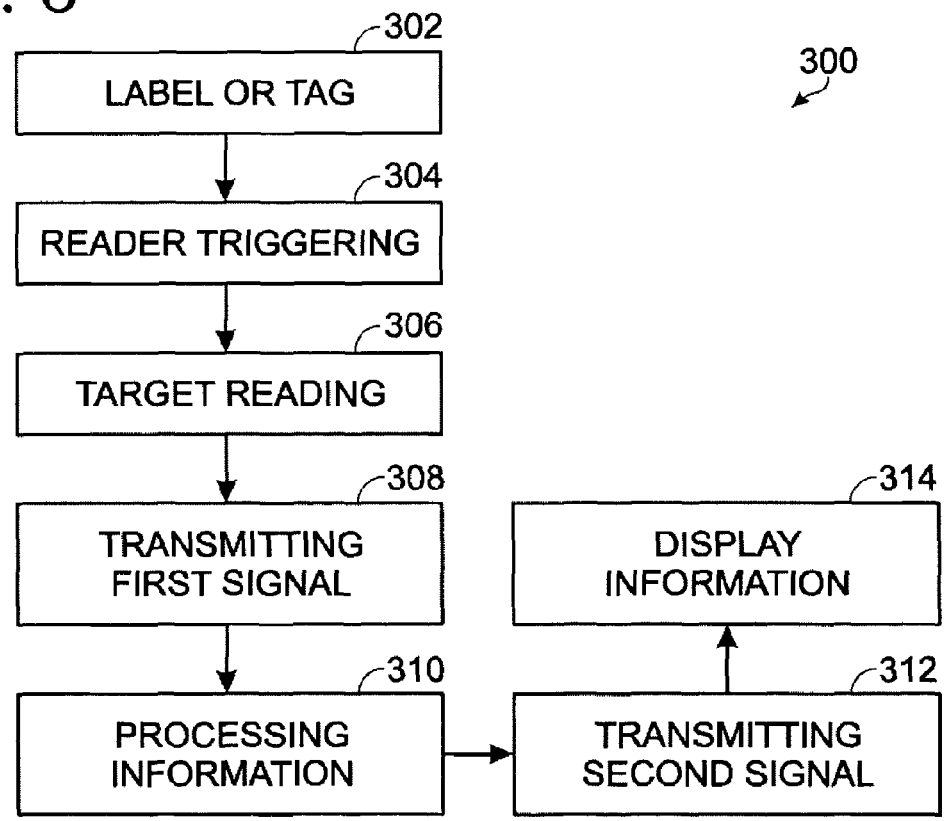
FIG. 6 is a logic diagram illustrating a method for identifying hazardous material in a transportation device in an embodiment of the disclosure.

FIG. 6 illustrates one embodiment of method 300 which identifies hazardous materials in transportation devices (not shown), including, but not limited to, trucks, storage tanks, bottles of chemicals, railroad tankers and cars, pallets and any vehicle or container that stores or transports hazardous materials. The method 300 includes, at step 302, locating an optical label 102 (as shown in FIG. 4) on a transportation device to be read by an optical reader 120. At step 304, the trigger 138 control is activated on the optical reader 120 for engaging power to begin imaging the optical label 102. The portable optical reader 120 may be a hand-held optical unit, wherein a user operates the optical reader 120 by pointing and sweeping the unit at an optical label 102 located on either a transportation device or storage container. The optical label 102 may be a barcode or other optical label that is formatted with bars and spaces representing digits and upon processing in the host computer 112 will identify information pertaining to a hazardous material. At step 306, the portable optical reader 120 begins to read, that is image, the optical label 102 at the second input (imager) 124 generating a first electromagnetic signal 122 after complete imaging of the optical label 102. The first electromagnetic signal 122 represents a barcode string of digits from the optical label 102 for correlating the digits to hazardous material information when processing in the host computer 112.

The method 300 allows identification and tracking of all hazardous materials that are either transported from place to place or maintained in a storage facility. At step 308, the first electromagnetic signal 122 is transmitted to the host computer 112 wherein, at step 310, the host computer processes the first electromagnetic signal 122. The processing generates a second electromagnetic signal 122a containing information on a particular hazardous material. The host computer 112 internally processes the first electromagnetic signal 122 by searching its memory comparing the received string of digits to stored information on the hazardous material. When the host computer 112 finds a match, the internal processing continues wherein the host computer generates a second electromagnetic signal 122a. At step 312, the second electromagnetic signal 122a is transmitted to a second display means 123. The second display receives the second electromagnetic signal 122a containing current NFPA or HMIS information on the hazardous material. Finally, at step 314 the information on the hazardous material is displayed. Alternately, the second electromagnetic signal may be transmitted over cable 122b to the first display means 114. The display means, that is the first and second display may include, but not be limited to, visual, printed and audio. It should be further understood that method 300 may include a display means that are a plurality of display units with remote locations such as shown in FIG. 5.

FIG. 6 illustrates another embodiment of method 300 which identifies hazardous materials in transportation devices (not shown), including, but not limited to, trucks, storage tanks, bottles of chemicals, railroad tankers and cars, pallets and any vehicle or container that stores or transports hazardous materials. The method 300 includes, at step 302, locating an RFID tag 102 (as shown in FIG. 4) on a transportation device to be read by an RFID reader 120. At step 304, the trigger 138 control is activated on the RFID reader 120 for engaging power to begin interrogating the RFID tag 102. The portable RFID reader 120 is a hand-held interrogator unit, wherein a user may operate the RFID reader 120 by pointing the unit at a RFID tag 102 located on either a transportation device or storage container. The RFID tag 102 may be either active or passive and is preprogrammed with information pertaining to a hazardous material. At step 306, the portable RFID reader 120 begins to interrogate the RFID tag 102 at the second input (interrogator) 124 and generates a first electromagnetic signal 122 after reading, that is interrogating, the RFID tag 102. The first electromagnetic signal 122 represents a modulated backscatter of preprogrammed code from the RFID tag 102 for correlating the modulated backscatter to hazardous material information when processing in the host computer 112.

The method 300 allows identification and tracking of all hazardous materials that are either transported from place to place or maintained in a storage facility. At step 308, the first electromagnetic signal 122 is transmitted to the host computer 112 wherein, at step 310, the host computer processes the first electromagnetic signal 122. The processing generates a second electromagnetic signal 122a containing information on a particular hazardous material. The host computer 112 internally processes the first electromagnetic signal 122 by searching its memory comparing the received modulated backscatter to stored information on the hazardous material. When the host computer 112 finds a match, the internal processing continues wherein the host computer generates a second electromagnetic signal 122*a*. At step 312, the second electromagnetic signal 122*a* is transmitted to a first display means 123. The first display receives the second electromagnetic signal 122*a* containing current NFPA or HMIS information on the hazardous material. Finally, at step 314 the information on the hazardous material is displayed. Alternately, the second electromagnetic signal may be transmitted over cable 122*b* to the first display means 114. The display means, that is the first and second display may include, but not be limited to, visual, printed and audio. It should be further understood that method 300 may include a display means that are a plurality of display units with remote locations such as shown in FIG. 5.

While there has been illustrated and described with reference to certain embodiments, it will be appreciated that numerous changes and modifications are likely to occur to those skilled in the art. It is intended in the appended claims to cover all those changes and modifications that fall within the spirit and scope of this disclosure and should, therefore, be determined only by the following claims and their equivalents.

What is claimed is:

1. A method of identifying hazardous materials using a RFID reader and RFID tag comprising the steps of:
   locating said RFID tag on a transportation device;
   activating a trigger control of said RFID reader for engaging power to begin reading said RFID tag;
   interrogating said RFID tag generating a first electromagnetic signal that represents a modulated backscatter of preprogrammed code from said RFID tag for correlating said modulated backscatter to hazardous material information when processing in a host computer;
   transmitting said first electromagnetic signal to a host computer wherein said host computer processes said first electromagnetic signal generating a second electromagnetic signal containing information on said hazardous material;
   transmitting said second electromagnetic signal to a display means wherein said display means receives information on said hazardous material; and
   displaying said information about said hazardous material.

2. The method as claimed in claim 1, wherein said code is based on a NFPA label system.

3. The method as claimed in claim 1, wherein said code is based on a HMIS label system.

4. The method as claimed in claim 1, wherein said transportation device is a plurality of vehicles.

5. The method as claimed in claim 1, wherein said transportation device is a plurality of containers.

6. A method of identifying hazardous materials using an optical reader and label comprising the steps of:
   locating said optical label on a transportation device;
   activating a trigger control of said optical reader for engaging power to begin imaging said optical label;
   reading said optical label generating a first electromagnetic signal that represents a barcode string of digits from said optical label for correlating said digits to hazardous material information when processing in a host computer;
   transmitting said first electromagnetic signal to said host computer wherein said host computer processes said first electromagnetic signal generating a second electromagnetic signal containing information on said hazardous material;
   transmitting said second electromagnetic signal to a display means wherein said display means receives said information on said hazardous material; and
   displaying said information on said hazardous material.

7. The method as claimed in claim 6, wherein said barcode is based on a NFPA label system.

8. The method as claimed in claim 6, wherein said barcode is based on a HMIS label system.

9. The method as claimed in claim 6, wherein said transportation device is a plurality of vehicles.

10. The method as claimed in claim 6, wherein said transportation device is a plurality of containers.

11. A RFID reader system for identifying hazardous material in a transportation device comprising:
   a) a RFID tag representing a modulated backscatter of preprogrammed code from said RFID tag for correlating said modulated backscatter to hazardous material information;
   b) a RFID reader having an input means and circuitry all within a portable housing for interrogating said RFID tag and generating a first signal;
   c) a host computer receiving said first signal of said modulated backscatter of preprogrammed code, wherein said host computer processes said first signal generating and transmitting a second signal, said second signal containing current information of said hazardous material; and
   d) a display means for a user to obtain said information on said hazardous material.

12. The system as claimed in claim 11, wherein said preprogrammed code is based on a NFPA label system.

13. The system as claimed in claim 11, wherein said preprogrammed code is based on a HMIS label system.

14. The system as claimed in claim 11, wherein said transportation device is a plurality of vehicles.

15. The system as claimed in claim 11, wherein said transportation device is a plurality of containers.

16. An optical reader system for identifying hazardous material in a transportation device comprising:
   a) an optical label representing a string of digits for identifying information pertaining to a hazardous material;
   b) an optical reader having an input means and circuitry all within a portable housing for imagining said optical label and generating a first signal after reading said optical label;
   c) a host computer receiving said first signal, wherein said host computer processes said first signal generating and transmitting a second signal, said second signal containing current information of said hazardous material; and
   d) a display means for a user to obtain said information on said hazardous material.

17. The system as claimed in claim 16, wherein said optical label encoding is based on a NFPA standard.

18. The system as claimed in claim 16, wherein said optical label encoding is based on a HMIS standard.

19. The system as claimed in claim 16, wherein said transportation device is a plurality of vehicles.

20. The system as claimed in claim 16, wherein said transportation device is a plurality of containers.

21. An optical label comprising: a plurality of formatted bars and spaces forming various widths representing a string of digits for identifying a hazardous material according to NFPA standards, wherein said formatted bars and spaces are arranged on a label in a NFPA system, said string of digits after processing identifying information of said hazardous material according to NFPA standards.

22. The optical label as claimed in claim 21, wherein the NFPA is substitutable with HMIS.

23. An RFID tag comprising: a semiconductor RF chip having a preprogrammed memory for identifying a hazardous material according to NFPA standards, and after processing identifying information on said hazardous material according to NFPA standards; an antenna; and a substrate.

24. The RFID tag as claimed in claim 23, wherein the NFPA is substitutable with HMIS.

* * * * *